United States Patent

Kobayashi et al.

[11] 4,149,365
[45] Apr. 17, 1979

[54] ARRANGEMENT FOR PREVENTING AXIAL DISPLACEMENT OF SPINNING ROTOR SPINDLE

[75] Inventors: Akira Kobayashi, Ohbu; Kunji Chiba, Kariya; Noriaki Miyamoto, Kariya; Masao Shiraki, Kariya; Naotake Furukawa, Aichi, all of Japan

[73] Assignee: Kabushiki Kaisha Toyoda Jidoshokki Seisakusho, Aichi, Japan

[21] Appl. No.: 793,194

[22] Filed: May 2, 1977

[30] Foreign Application Priority Data

May 1, 1976 [JP] Japan .............................. 51-55504[U]
May 10, 1976 [JP] Japan .................................. 51-52961
May 10, 1976 [JP] Japan .................................. 51-52962

[51] Int. Cl.² ...................... D01H 1/241; D01H 1/243
[52] U.S. Cl. ...................... 57/104; 57/58.89; 74/210; 308/149; 308/163; 308/172
[58] Field of Search ............... 57/58.89, 77.45, 104, 57/103; 74/210; 308/163, 135, 149, 172, 150, 156, DIG. 3, 152

[56] References Cited

U.S. PATENT DOCUMENTS

| | | | |
|---|---|---|---|
| 2,855,750 | 10/1958 | Schrenk et al. | 57/77.45 |
| 3,779,620 | 12/1973 | Stahlecker | 308/152 |
| 3,793,820 | 2/1974 | Rajnoha et al. | 57/58.89 |
| 3,877,212 | 4/1975 | Canzler | 57/58.89 |
| 4,008,563 | 2/1977 | Gassner et al. | 57/77.45 |

FOREIGN PATENT DOCUMENTS

| | | | |
|---|---|---|---|
| 1252845 | 10/1967 | Fed. Rep. of Germany | 57/77.45 |
| 1913728 | 10/1970 | Fed. Rep. of Germany | 57/58.89 |

*Primary Examiner*—Charles E. Frankfort
*Attorney, Agent, or Firm*—Wenderoth, Lind & Ponack

[57] ABSTRACT

An open end spinning machine includes a row of spinning rotors each connected to spindles rotatably supported in their predetermined axial position by associated twin-disk mechanisms and driven by a belt moving across the spindles. When the spindle is subjected to an external axial force in either of opposite axial directions due to disturbance of a right-angled relationship between the belt and the spindle, an arrangement according to the invention causes the spindle to be subjected to a force, the direction of which is directly opposite to and the strength of which is in proportion to that external axial force due to the disturbance of the right-angled relationship, whereby the spindle is maintained in the predetermined axial position.

4 Claims, 18 Drawing Figures

ARRANGEMENT FOR PREVENTING AXIAL DISPLACEMENT OF SPINNING ROTOR SPINDLE

BACKGROUND OF THE INVENTION

This invention relates to spinning rotor spindles in an open end spinning machine and more particularly to twin-disk mechanisms for rotatably supporting the associated rotor spindle.

In an open end spinning machine of the type described, the rotor spindles supported for rotation by the associated twin-disk mechanisms are rotated or driven simultaneously by a driving belt, which runs across the rotor spindles at a right angle thereto and in frictional engagement therewith. If there occurs a deviation in the driving belt from the correct path of travel thereof, each rotor spindle will be subjected to a force or a thrust tending to move the spindle in either of opposite axial directions thereof, resulting in a change in the axial position of the rotor spindle. It is therefore understood that the belt and the rotor spindles must always be maintained at an angular relationship of 90° relative to each other. It is however very difficult to do so, because an external thrust exerted on the rotor spindle is also provided by snake or wandering lateral motions of the belt.

In order to prevent the axial displacement of the rotor spindle, a number of arrangements have been proposed and employed in practice in the open end spinning machine. In one arrangement, for example, either the driving belt or the twin-disk mechanism is disposed to slightly deviate from a right angle alignment relative to the rotor spindle to thereby cause the rotor spindle to always be subjected to a thrust acting in one direction, and a thrust bearing is disposed at the end of the rotor spindle to receive the thrust, whereby the rotor spindle is maintained in the required position.

Such an arrangement of the driving belt or the twin-disk mechanism is of course undesirable with respect to the design and installation thereof. Especially, in the case of the twin-disk mechanism being inclined relative to a line perpendicular to the axis of the associated rotor spindle, each supporting disk will be allowed to contact only at a portion of its peripheral surface with the rotor spindle, the contact portion of each supporting disk thus being greatly worn. This results in a premature replacement of the twin-disk mechanism and/or the rotor spindle.

SUMMARY OF THE INVENTION

It is accordingly a principle object of this invention to provide an arrangement for preventing an axial displacement of a spinning rotor spindle in an open end spinning machine, which arrangement is simple and inexpensive and which eliminates the disadvantages of the prior art.

With this object in view, the invention resides in an arrangement for preventing an axial displacement of a spindle connected to a spinning rotor of a spinning machine and driven by a belt longitudinally moving across the spindle, the spindle being subjected to an external thrust in either of opposite axial directions due to disturbance of the right-angled relationship between the spindle and the belt, the arrangement comprising a twin-disk support mechanism including two pairs of disks disposed on the opposite sides of the spindle in frictional engagement therewith to support the spindle for rotation, first means for applying an axial force to the spindle in a first of the opposite axial directions when the spindle is subjected to the thrust in a second axial direction, and second means for applying an axial force to the spindle in the second axial direction when the spindle is subjected to the thrust in the first of the opposite axial directions, the axial forces produced by the first and second means being increased with the external thrust due to the disturbance of the right-angled moving relationship of the belt with the spindle.

BRIEF DESCRIPTION OF THE DRAWINGS

This invention will become more readily apparent from the following description made in conjunction with preferred embodiments shown, by way of example only, in the accompanying drawings, in which similar reference numerals denote similar or corresponding parts throughout various figures and in which.

DESCRIPTION OF THE PREFERRED EMBODIMENTS

Figure 1:
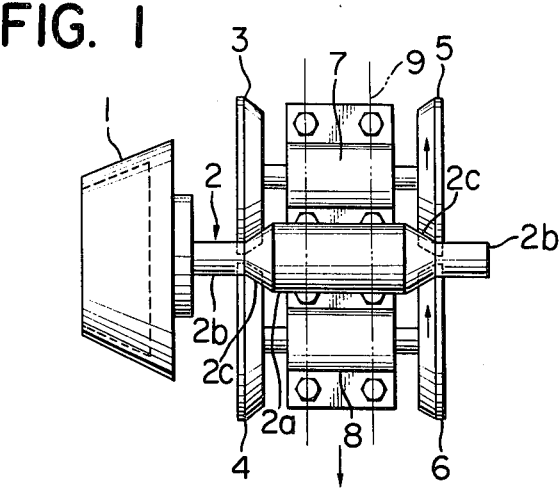
FIG. 1 is a plan view showing a first embodiment of an arrangement for rotatably supporting a spindle of a spinning rotor constructed in accordance with the present invention.
Figure 2:
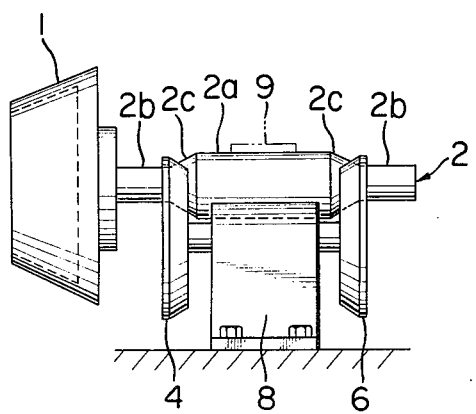
FIGS. 2 and 3 are side and front elevational views of the arrangement shown in FIG. 1.
Figure 3:
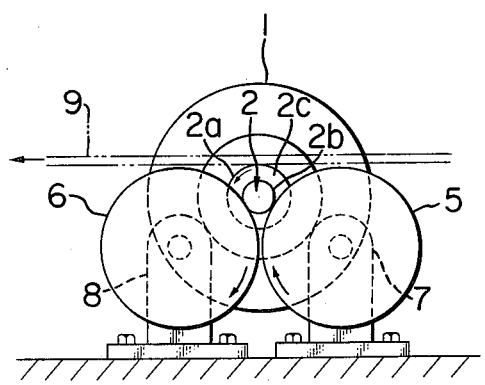

Referring now to the drawings and particularly to FIGS. 1 to 3, there is shown a twin-disk mechanism employing a first embodiment according to the invention. The twin-disk mechanism is for rotatably supporting a spindle or shaft 2 integrally connected to a spinning rotor 1, in which not shown fibers are spun into a yarn in a well known manner. The twin-disk mechanism comprises a first pair of disks 3 and 4 disposed on opposite sides of the spindle 2 in frictional engagement therewith, and a second pair of disks 5 and 6 disposed on opposite sides of the spindle 2 in frictional engagement therewith. The disks 3 and 4 of the first pair are axially spaced from the disks 5 and 6 of the second pair, respectively. The disks 3 and 5 on one side of the spindle 2 are supported for rotation by a bearing means 7. Similarly, the disks 4 and 6 on the other side of the spindle 2 are rotatably supported by a bearing means 8. Both the bearing means 7 and 8 may be of a conventional construction and therefore detailed description thereof can be eliminated. It is understood from the foregoing and as seen from FIG. 3 that the spindle 2 is rotatably supported in generally wedge-shaped upper spaces formed between the paired disks 3 and 4 and the paired disks 5 and 6. A generally mid portion 2a of the spindle 2 is in frictional engagement with a conventional belt 9 thereby to be rotated. Although the spinning machine includes a row of spindles 2 and accordingly a row of associated twin-disk mechanism, only one assembly thereof is shown for simplification of the figures. Therefore, the belt 9 runs across the row of spindles 2 in a direction shown by an arrow in FIG. 3, which direction is normally perpendicular to the axis of the spindle 2.

The aforesaid mid portion 2a of the spindle 2 is expanded radially outwardly to have a larger diameter than other portions 2b of the spindle 2, thus forming generally conical surface portions 2c between the portions 2a and 2b. Each of the disks 3 to 6 is in contact with one of the portions 2c of the spindle 2 and therefore has a complementary peripheral surface.

In the first embodiment shown in FIGS. 1 to 3, assuming that the spindle 2 is being subjected to an axial force acting in the right hand direction in FIG. 1, the peripheral surfaces of the disks 5 and 6 resist this force and react upon the right hand portion 2c of the spindle 2, thus maintaining the spindle 2 in the prescribed axial position. Inversely, when the spindle 2 is subjected to an axial force action to the left hand direction, the peripheral surfaces of the disks 3 and 4 similarly resist this force and react upon the left hand portion 2c of the spindle 2 with a force equal to that force.

Figure 1A:
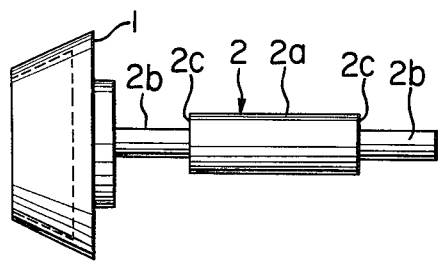
FIGS. 1A and 1B show different modifications of the spindle of FIG. 1.
Figure 1B:
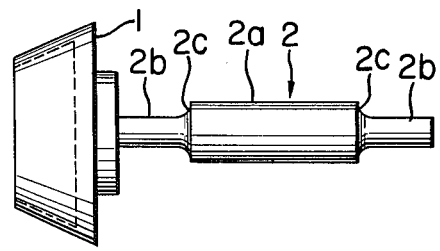

Each portion 2c connecting the larger diameter portion 2a and a smaller diameter portion 2b may be an annular surface perpendicular to the axis of the spindle 2 as shown in FIG. 1A and may be a rounded surface as shown in FIG. 1B. In the former case, the peripheral surface of each disk is cylindrical and contacts and supports the smaller diameter portion 2b of the spindle 2. The marginal end surface of each disk is in engagement with the annular surface portion 2c to limit the axial displacement of the spindle 2. In the latter case, each disk is only required to have a peripheral surface complementary to the rounded surface 2c.

Figure 4:
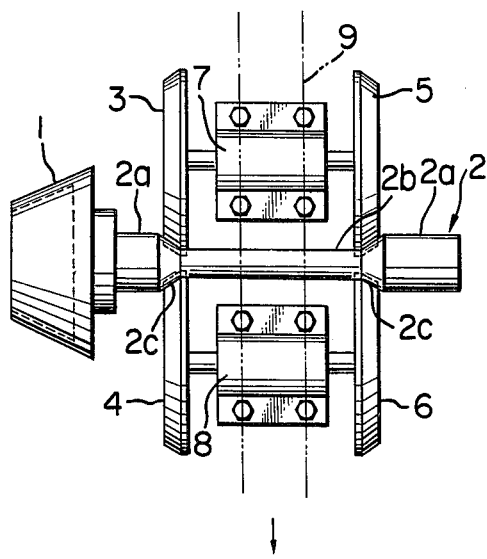
FIGS. 4 to 6 are views, similar to FIG. 1, showing different modifications of the first embodiment of FIG. 1.

In a modification shown in FIG. 4, the mid portion 2b of the spindle 2 at which the spindle 2 contacts the belt 9 is adapted to have a smaller diameter than the other spindle portions 2a. Therefore, assuming that the spindle is being subjected to a thrust due to snake motion of the belt 9, the thrust being directed in the right hand direction in FIG. 4, the peripheral surfaces of the disks 3 and 4 resist this thrust and react upon the left hand portion 2c of the spindle 2, thus maintaining the spindle 2 in the prescribed axial position. Inversely, in the case of the thrust being directed in the left hand direction in FIG. 4, the peripheral surfaces of the disks 5 and 6 resist the thrust and induce a reaction against the right hand portion 2c of the spindle 2, thereby maintaining the latter in the prescribed axial position.

Figure 5:
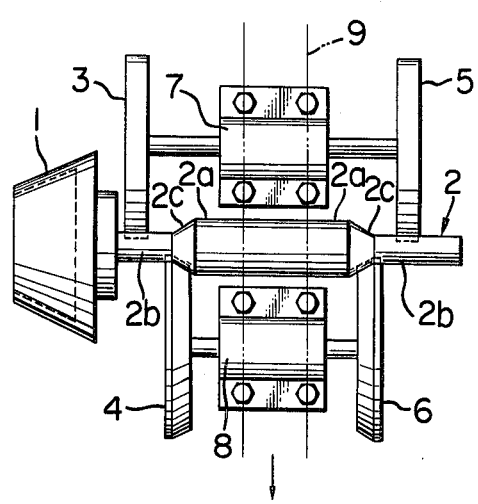

FIG. 5 shows another modification, which is similar to the embodiment of FIGS. 1 to 3 except that the disks 3 and 5 on one side of the spindle 2 do not face to the disks 4 and 6 on the other side of the spindle 2, respectively, and only the disks 4 and 6 are allowed to contact the associated portions 2c of the spindle 2c. Therefore, the arrangement shown in FIG. 5 operates in the same manner as that of FIG. 1 to 3.

In FIG. 5, the disks 3 and 5 have cylindrical peripheral surfaces at which they support the smaller diameter portions 2b of the spindle 2. However, they may be arranged to support the larger diameter portion 2a.

Figure 6:
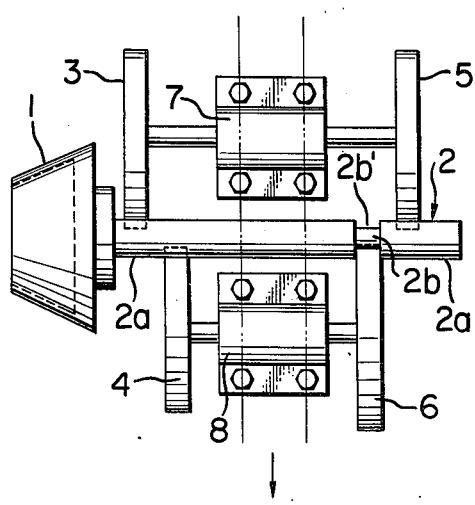

FIG. 6 shows a further modification, wherein the spindle 2 is formed to have a smaller diameter portion 2b having an axial width substantially equal to or slightly larger than the width of an associated disk. An annular groove 2b' provided by the smaller diameter portion 2b is adapted to receive therein the disk 6 to limit axial displacement of the spindle 2. Regarding the disks 3 to 5, they only support the larger diameter portions 2a of the spindle 2. The arrangement of FIG. 6 operates in the manner similar to the arrangements shown in FIGS. 1 to 5.

It will be understood from the foregoing that in the first embodiment of FIG. 1 and the various modifications thereof the spindle can be always maintained in the prescribed axial position without any assitance of additional members and only by the specific engagement of the spindle with the disk or disks. That is, the spindle is adapted to engage the disks so as to provide first means for applying an axial force to the spindle to bias the spindle in a first axial direction at least when the spindle is forced in a second axial direction, and second means for applying an axial force to the spindle to bias the spindle in the second axial direction at least when the spindle is forced in the first axial direction. This eliminates the necessity for severely prescribing the direction of the driving belt with respect to the rotor spindle and therefore the easy installation of the belt and rotor spindles can be accomplished. Further, a thrust bearing which has been employed in the prior arrangement can be removed.

Figure 7:
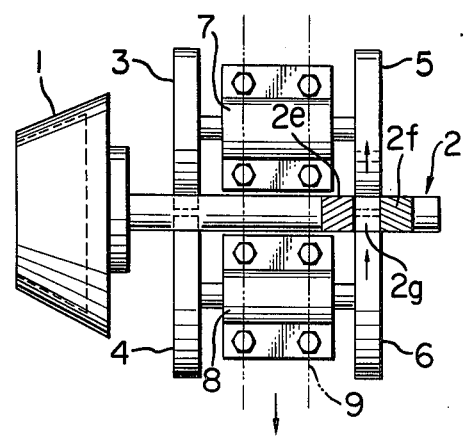
FIG. 7 is a plan view showing a second embodiment of the arrangement according to the invention.

In a second embodiment shown in FIG. 7, axially spaced helical gear portions 2e and 2f are provided in the surface of the rotor spindle 2. A spacing 2g between the helical gear portions 2e and 2f substantially equals the widths of the disks 5 and 6, and when the spindle 2 is in the prescribed axial position shown in FIG. 7, the disks 5 and 6 are exactly positioned between the helical gear portions 2e and 2f, that is, disks 5 and 6 come into contact with only the intermediate smooth portion 2g so that no influence of the helical gear portions 2e and 2f is produced on the spindle 2.

The helical gear portions 2e and 2f are provided for compensation for the axial deviation of the spindle 2 from the aforementioned prescribed position. Thus, the directions of the teeth of the portions 2e and 2f are opposite to each other, and the portions 2e and 2f can apply oppositely directed thrusts to the spindle 2. In the embodiment of FIG. 7, the portion 2e has left-hand helices and the portion 2f has right-hand helices.

Figure 7A:
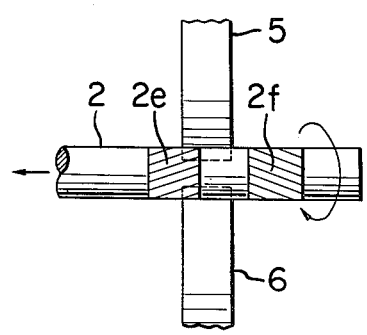
FIGS. 7A and 7B are fragmental views illustrating the operation of the arrangement shown in FIG. 7.
Figure 7B:
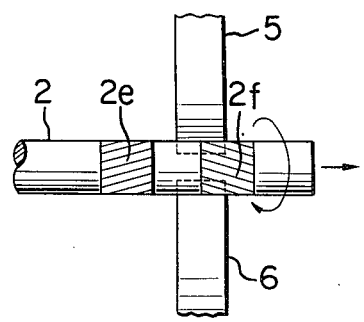

In operation, when the spindle 2 is rotated in the counterclockwise direction as shown by the arrow in FIG. 7A and is subjected to an axially outwardly acting thrust (which is in the direction of the spindle end, i.e. to the right as shown in FIG. 7A) due to the travel of the belt 9, the spindle 2 is moved in the direction of the spindle end until an axially inwardly acting thrust (i.e. as shown by the arrow in FIG. 7A), applied to the spindle 2 in the direction of the spinning rotor 1 due to engagement of the left-hand helical portion 2e with the disks 5 and 6, exceeds the axially outwardly acting thrust, whereupon the spindle 2 can be restored to the prescribed axial position. Inversely, when the spindle 2 is moved in the direction of the spinning rotor 1, the right-hand helical portion 2f of the spindle 2 comes in contact with the disks 5 and 6 as shown in FIG. 7B, the spindle 2 being restored to the neutral position in a similar manner. The axial force produced by the engagement of the helical portion 2e or 2f with the disks is in proportion to the axial length of the helical portion 2e or 2f through which the associated disk is in contact, that is, to the axially inwardly or outwardly acting thrust due to the travelling of the belt 9.

Although in the embodiment of FIG. 7 the helical portions 2e and 2f are provided on the side of the free end of the spindle, they may be on the side of the spindle adjacent spinning rotor 1. In the latter case, they are brought into engagement with the disks 3 and 4 when the spindle 2 is deviated from the neutral position.

Figure 8:
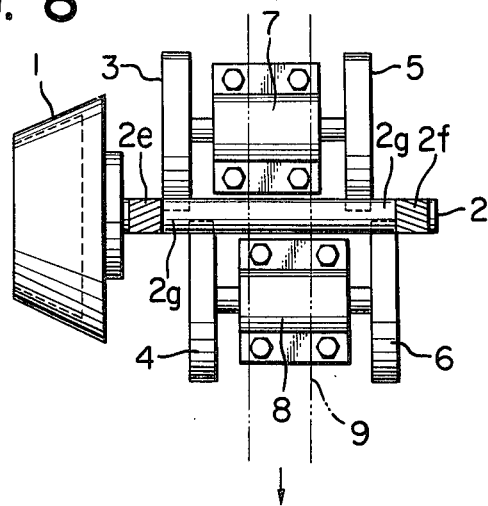
FIGS. 8 and 9 are plan views showing different modifications of the arrangement of FIG. 7.

FIG. 8 shows a modification of the arrangement shown in FIG. 7. In the modification shown, although the disks 3 to 6 are staggered in order of reference numeral, this specific alignment is not necessary. The portion 2e formed with the left-hand helical grooves is positioned between the spinning rotor 1 and the innermost disk 3 with the outer end face of the portion 2e being coextensive with the inner end face of the disk 3 when the spindle 2 is in the required neutral position shown in FIG. 8. Similarly, the right-hand helix-grooved portion 2f is positioned adjacent the spindle end so that its inner end face is coextensive with the outer end face of the outermost disk 6 under the aforesaid neutral position of the spindle 2.

The portions 2e and 2f may be arranged between the disks 4 and 5. In this case, however, the portion 2e for applying the thrust to the spindle 2 in the direction of the rotor has to be positioned to associate with the disk 5, while the portion 2f for applying the thrust to the spindle 2 in the direction of the spindle end has to be positioned to associate with the inner end face of the disk 4.

Figure 9:
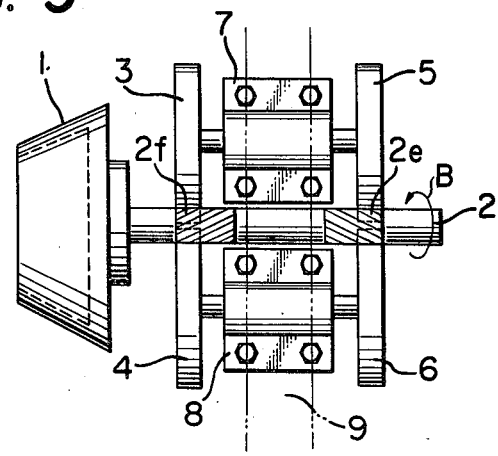

A further modification of the second embodiment is shown in FIG. 9, wherein the helical groove portions 2e and 2f have an axial length substantially greater than the width or thickness of the disk. The portions 2f and 2e are for applying the inward and outward thrusts to the spindle 2, respectively, and are so spaced that when the inner edge of the portion 2f is in alignment with the inner end faces of the paired disks 3 and 4, that is, when the spindle 2 is in the required neutral position, the outer edge of the portion 2e is aligned with the outer end faces of the paired disks 5 and 6. If desired, the portions 2e and 2f may have a diameter larger than that of the other spindle portion.

In FIG. 9, assuming that the spindle 2 is being rotated in the direction shown by the arrow, it is subjected to both an inward thrust by means of the left-hand helices provided in the portion 2e and an outward thrust by means of the right-hand helices provided in the portion 2f. If there is no external force on the spindle 2, the latter can be maintained in the axial position of FIG. 9, i.e. the required neutral position, because at this time the axial length for which the disks 3 and 4 are in contact with the portion 2f is equal to that for the disks 3 and 4 and therefore the inward and outward thrusts due to the engagement with the portions 2e and 2f are balanced. However, when the spindle 2 is moved inwardly or leftwardly in FIG. 9 by any external force, such as a force produced due to lateral movement of the belt 9, the axial length for which the disks 3 and 4 are in contact with the portion 2f is apparently maintained unchanged, while the axial length for which the disks 5 and 6 contact the portion 2e is reduced by the amount of axial movement of the spindle 2. Thus, the outward thrust from portion 2f will be larger than the thrust from portion 2e and serves to move the spindle 2 outwardly or rightwardly over the increased external inward thrust, thus restoring the spindle into the neutral position. In contrast to the above, when the spindle 2 is moved outwardly or rightwardly by, for example, a snake motion of the belt 9, the outward thrust produced due to engagement of the disks 3 and 4 with the portion 2f is decreased and the spindle 2 can be restored in its neutral position by the force differential between the inward and outward thrusts, which acts in the direction of the spinning rotor 1.

Although, in the arrangements shown in FIGS. 7, 7A, 7B, 8 and 9, the grooves provided in the portions 2e and 2f are helices which slope around the cylindrical surface of the spindle, the invention is not limited thereto and may employ any other grooves extending with inclination relative to the axis of the spindle.

With respect to the arrangement shown in FIGS. 7, 7A, 7B, 8 and 9, it is understood from the foregoing that the spindle can be quickly restored in its neutral position without any assistance of additional members and only by the specific engagement between the spindle and the disks as in the arrangements of FIGS. 1 to 6. Thus, the description concerning the advantageous features of the arrangements of FIGS. 1 to 6 is similarly applicable to the arrangements shown in FIGS. 7, 7A, 7B, 8 and 9. Especially in the arrangements of FIGS. 7 and 8, there is a further advantage that as far as the spindle 2 is maintained in the neutral position, both the first and second means for applying the axial force to the spindle to compensate for deviation thereof from the neutral position are inoperative and do not apply any axial force to the spindle, thereby decreasing wear of the friction members and increasing the durability thereof.

Figure 10:
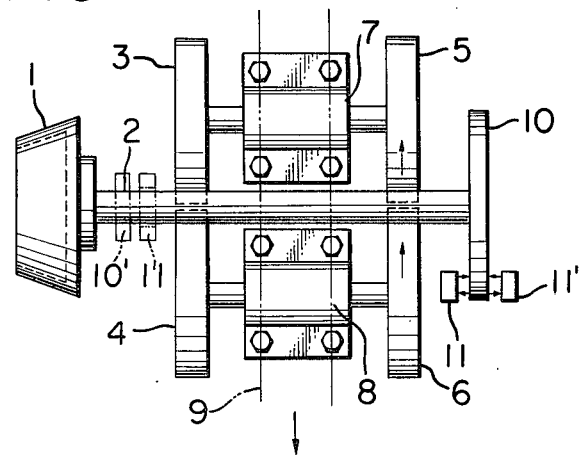
FIG. 10 is a plan view showing a third embodiment of the arrangement according to the invention.

With respect to a third embodiment shown in FIG. 10, the restoring of the spindle 2 to the neutral position is adapted to be accomplished by first and second means, both of which are not more in physical contact with the spindle. In FIG. 10, the spindle 2 is provided at the end away from the spinning rotor 1 with a disk-like permanent magnet 10. A pair of permanent magnets 11 and 11' are spaced a predetermined distance and fixedly arranged on the opposite sides of the magnet 10 so that repulsive forces are produced between the magnets 10 and 11, 11'. Thus, it is understood that the spindle 2 exhibits a tendency to be forced to the neutral position where both the repulsive forces are balanced.

In operation, if the spindle 2 as well as the magnet 10 is moved either inwardly or outwardly by any external force, the magnet 10 will approach either the magnet 11 or 11' whereby the repulsion between the magnets 10 and 11 or 11' is increased, but the repulsion between the magnets 10 and 11' or 11 is decreased. Therefore, the spindle 2 can be restored to the neutral position because these magnets 10, 11 and 11' are selected to produce a differential repulsive force stronger than the presumed external force causing the axial deviation of the spindle from the neutral position.

One of the magnets 11 and 11' (for example, the magnet 11) may be mounted around the spindle 2 and on a not shown stationary member as shown by the imaginary line in FIG. 10. In this case, an additional magnet 10' has to be fixedly mounted around the portion of the spindle between the spinning rotor 1 and the stationary magnet to generate a repulsive force between the magnet 10' and 11.

Figure 11:
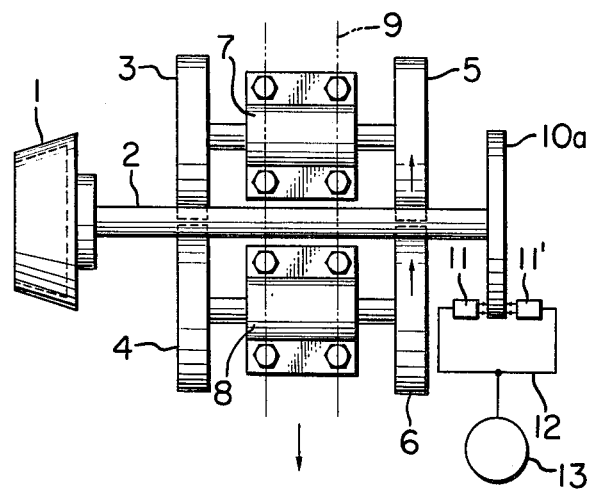
FIG. 11 is a plan view showing a modification of the third embodiment of FIG. 10.

In FIG. 11, a modification of the third embodiment shown in FIG. 10 is illustrated. Instead of the magnets, fluid nozzles 11 and 11' are employed for discharging fluid, such as air or water, against a disk 10a securely connected to the end of the spindle 2. The fluid is supplied from a suitable fluid supplying device 13, such as a pump or a compressor, through a piping 12 to the nozzles 11 and 11', and hence the fluid flows toward opposite sides of the disk 10a in directions perpendicular thereto and parallel to the axis of the spindle 2, and the fluid then impinges on the opposite sides of the disk 10a. The arrangement is such that when the disk 10a is in a position midway between the nozzles 11 and 11', the disk 10a and hence the spindle 2 is subjected to opposite axial forces of the same magnitude due to the opposite jets of the fluid. The more the disk 10a approaches one of the nozzles 11 and 11' due to a snake motion of the belt 9, the stronger is the force applied to the disk 10a by such one nozzle, thus restoring the disk 10a to the neutral position.

Figure 12:
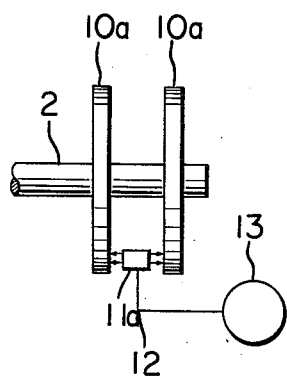
FIGS. 12 to 14 are fragmental views showing further modifications of the third embodiment of FIG. 10.

Another modification is shown in FIG. 12, wherein a pair of disks 10a are mounted on the spindle 2 in axially spaced relation and a double ported fluid nozzle 11a is interposed between the disks 10a, whereby the spindle 2 in any deviated position can be restored to the neutral position by the action of the fluid discharged from the double ported nozzle 11a.

Figure 13:
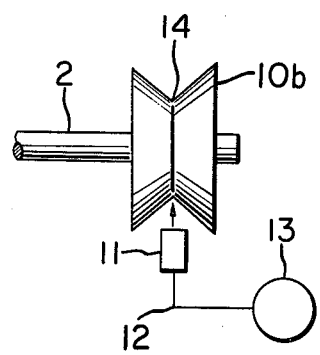
Figure 14:
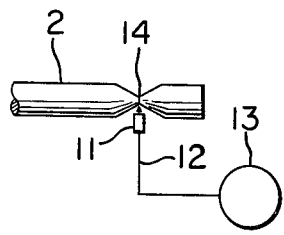

Further modifications are shown in FIGS. 13 and 14, wherein fluid discharged from a single nozzle 11 is adapted to impinge upon a V-shaped groove 14. In FIG. 13, the V-shaped groove 14 is provided in a separate member 10b fixed to the spindle 2 and, in FIG. 14 the same is formed in the spindle 2 itself. Oppositely inclined surfaces forming the V-shaped groove 14 have preferably the same angle of inclination and the nozzle 11 is arranged to direct the fluid toward the connection of the oppositely inclined surfaces when the spindle 2 is maintained in the neutral position. Therefore, if the spindle is deviated from the neutral position due to a snake motion of the belt, the major part of the fluid injected from the nozzle will impinge on one of the inclined surfaces of the V-shape and the minor part will be directed toward the other inclined surface of the V-shaped groove, resulting in the spindle being restored to the neutral position.

It will be understood from the foregoing that the invention has provided an arrangement for rotatably supporting a spinning rotor spindle in an open end spinning machine, without causing axial displacement of the rotor spindle, which arrangement is simple and inexpensive and which eliminates the disadvantages of the prior art.

Although various specific embodiments have been described above, it will be readily understood by those skilled in the art that various rearrangements of components and modifications of components may be accomplished without departing from the spirit and scope of the invention as defined in the appended claims.

What we claim is:

1. An open end spinning system comprising:
    an elongated spindle having first and second opposite ends;
    a spinning rotor connected to said first end of said spindle;
    first and second pairs of disks rotatably supporting said spindle, said disks having peripheral surfaces in frictional contact with said spindle, all of said disks having axes which extend parallel to the longitudinal axis of said spindle;
    a drive belt driven in contact with an outer surface of said spindle, thereby rotating said spindle in contact with said peripheral surfaces of said disks, said drive belt being subjected to forces causing said drive belt to be driven across said spindle in directions extending at angles other than a right angle with respect to said longitudinal axis of said spindle, thereby imparting first and second axial thrusts to said spindle in first and second opposite axial directions thereof and causing said spindle to move in said first and second opposite axial directions away from a neutral position;
    first means for imparting a first axial restoring force to said spindle to move said spindle in said second axial direction in opposition to said first axial thrust and to return said spindle to said neutral position, said first restoring force imparting means comprising first helical grooves formed in said spindle at a first axial position to be selectively contacted by the peripheral surface of at least one of said disks, said first helical grooves extending around said spindle in a first helical direction; and
    second means for imparting a second axial restoring force to said spindle to move said spindle in said first axial direction in opposition to said second axial thrust and to return said spindle to said neutral position, said second restoring force imparting means comprising second helical grooves formed in said spindle at a second axial position to be selectively contacted by the peripheral surface of at least one of said disks, said second helical grooves extending around said spindle in a second helical direction opposite to said first helical direction.

2. A system as claimed in claim 1, wherein said first and second helical grooves are axially spaced along said spindle by a distance corresponding to the axial thickness of said at least one disk.

3. A system as claimed in claim 1, wherein said first and second helical grooves are axially spaced along said spindle by a distance such that all of said disks are positioned between and not in contact with said first and second helical grooves when said spindle is in said neutral position.

4. A system as claimed in claim 1, wherein said first and second helical grooves each have axial lengths greater than the axial thickness of said disks, and said first and second helical grooves are axially spaced along said spindle such that when said spindle is in said neutral position the peripheral surface of at least one of said disks of said first pair of disks is in contact along the entire axial length thereof with said first helical grooves and the peripheral surface of at least one of said disks of said second pair of disks is in contact along the entire axial length thereof with said second helical grooves, when said first thrust moves said spindle in said first axial direction the axial contact between said peripheral surface of said at least one disk of said second pair of disks with said second helical grooves decreases, and when said second thrust moves said spindle in said second axial direction the axial contact between said peripheral surface of said at least one disk of said first pair of disks with said first helical grooves decreases.

* * * * *